No. 788,661. PATENTED MAY 2, 1905.
T. J. LINDSAY.
SPRING SEAT FOR AUTOMOBILES.
APPLICATION FILED NOV. 14, 1904.
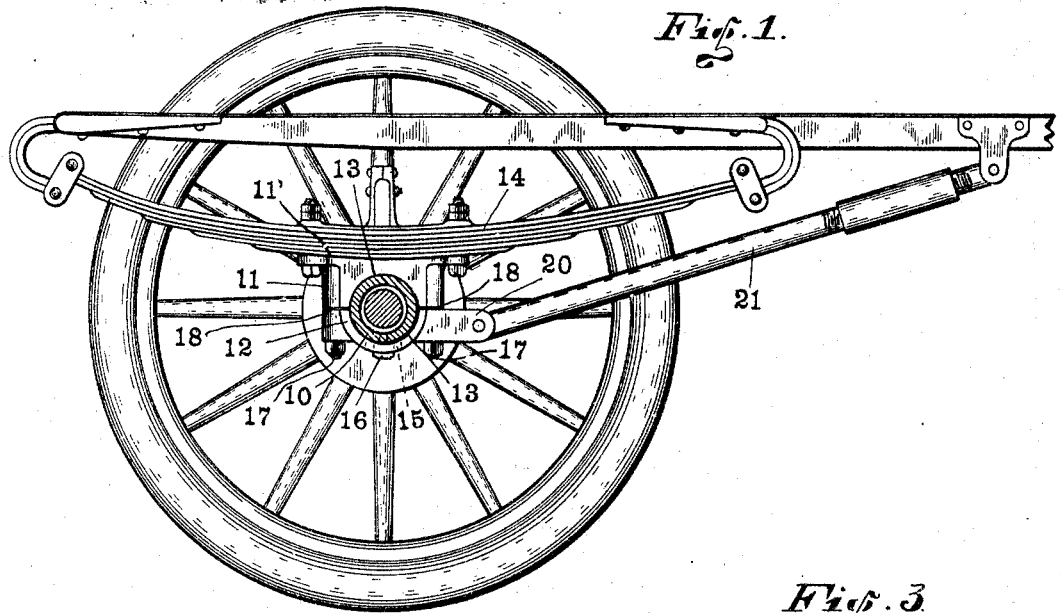
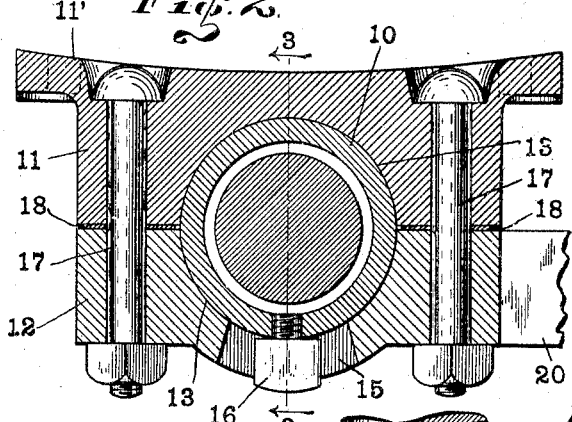
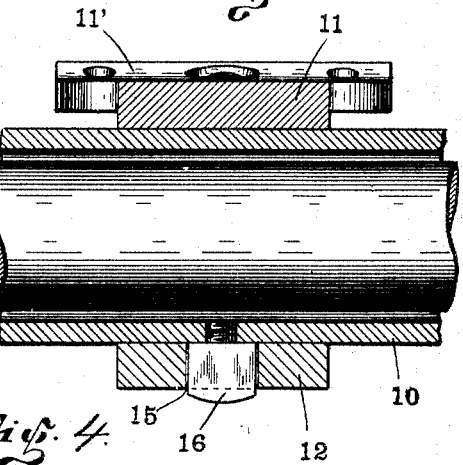
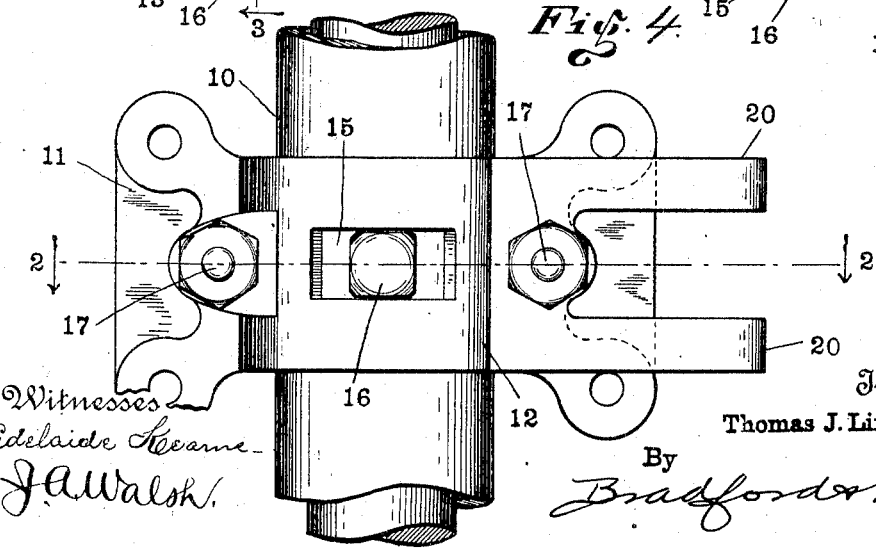
Witnesses
Adelaide Keane
J. A. Walsh
Inventor
Thomas J. Lindsay
By Bradford & Hood
Attorneys No. 788,661.

Patented May 2, 1905.

UNITED STATES PATENT OFFICE.

REISSUED

THOMAS J. LINDSAY, OF INDIANAPOLIS, INDIANA.

SPRING-SEAT FOR AUTOMOBILES.

SPECIFICATION forming part of Letters Patent No. 788,661, dated May 2, 1905.

Application filed November 14, 1904. Serial No. 232,682.

*To all whom it may concern:*

Be it known that I, THOMAS J. LINDSAY, a citizen of the United States, residing at Indianapolis, in the county of Marion and State of Indiana, have invented certain new and useful Improvements in Spring-Seats for Automobiles, of which the following is a specification.

The object of my invention is to produce a neat and efficient seat for the springs of automobiles, the construction being such that the seat may be attached to the axle structure either fixedly or pivotally and of such character that it may be applied to axle structures having enlarged ends.

A further object of my invention is to produce means by which a suitable brace-rod may be attached directly to the spring-seat when desired.

The accompanying drawings illustrate my invention.

Figure 1 is a side elevation of my improved spring-seat, in conjunction with the coöperating parts. Fig. 2 is a vertical section of the spring-seat and axle, to which it is attached; Fig. 3, an axial section, and Fig. 4 an under plan.

In the drawings, 10 indicates the rear axle structure, which in the present case is such a structure as is described and claimed in my Patent No. 748,760. The spring-seat is composed of two mating portions 11 and 12, these parts being provided on their adjacent faces with transverse substantially semicircular grooves 13 for the reception of the axle structure 10. The upper side of the portion 11 is formed into a spring-receiving face 11', to which any desired form of spring—such, for instance, as a semi-elliptical leaf-spring 14—is to be attached. The portion 12 is provided in its under side with a transverse slot 15, which extends into the socket 13 and is of such size as to receive the head of a screw 16, which is screwed into the structure 10. The slot 15 is of such size as to permit angular movement of the spring-seat on the axle structure 10, but such as to prevent rotative movement of the screw 16, thus serving as a lock to prevent accidental removal of the screw. The two parts 11 and 12 are clamped together upon the axle structure by means of bolts 17.

When it is desired that the spring-seat be angularly movable upon the axle structure 10, shims 18 are placed between the two portions 11 and 12, so that when the bolts 17 are drawn tight the seat will still remain sufficiently loose upon the axle structure to permit angular movement. If a tight seat is desired, it is merely necessary to remove the shims, whereupon the bolts 17 will serve to draw the two parts 11 and 12 tight upon the axle structure. One of the parts 11 or 12, preferably the cap portion 12, is provided with a pair of parallel perforated ears 20, between which may be attached one end of the usual brace-rod 21.

I am aware that spring-seats have been made heretofore of such character that they could be slipped axially over the end of an axle structure and be free to rotate thereon; but in all such cases, so far as I am aware, the construction is such that it cannot be applied to an axle structure having enlarged ends. In my companion application, Serial No. 232,681, I show a construction in which the tubular axle-sections, within which the drive-shaft sections are journaled, have swaged outer ends, which receive the bearings for the axle-section, and in such construction it is impossible to slip a spring-seat axially onto the axle structure. It is for this reason that I have made the spring-seat of two mating portions, so that the seat may be applied to any desired part of the axle structure. In such construction it is absolutely essential to provide means by which the position of the spring-seat on the axle structure may be fixed longitudinally. By the use of the single screw 16 and the slot 15 I am enabled to accomplish this result with a minimum number of parts, the construction being such, however, that the seat may be either pivoted or fixed and also such as to prevent any possibility of longitudinal slipping of the seat on the axle structure and to prevent any loosening of the parts by reason of jar.

I claim as my invention—

1. A spring-seat for automobiles consisting of a pair of separable members provided on their adjacent faces with transverse grooves adapted to receive a round axle structure, one of said parts being provided with a spring-receiving portion, and one of said parts being provided with a slot communicating with the transverse axle-receiving groove and adapted to receive a pin carried by the axle structure; and means for clamping the two parts of the spring-seat upon the axle structure.

2. A spring-seat for automobiles consisting of a pair of separable members provided on their adjacent faces with transverse grooves adapted to receive a round axle structure, one of said parts being provided with a spring-receiving portion, one of said parts being provided with a slot communicating with the transverse axle-receiving groove and adapted to receive a pin carried by the axle structure, and one of said parts being provided with a transversely-extending ear to which a brace-rod may be attached; and means for clamping the two parts of the spring-seat upon the axle structure.

In witness whereof I have hereunto set my hand and seal, at Indianapolis, Indiana, this 5th day of November, A. D. 1904.

THOMAS J. LINDSAY. [L. S.]

Witnesses:
ARTHUR M. HOOD,
JAMES A. WALSH.